United States Patent
Ramachandran et al.

(10) Patent No.: US 10,649,763 B2
(45) Date of Patent: May 12, 2020

(54) RESOURCE EFFICIENT DEPLOYMENT OF MULTIPLE HOT PATCHES

(71) Applicant: Microsoft Technology Licensing, LLC, Redmond, WA (US)

(72) Inventors: Sai Ganesh Ramachandran, Redmond, WA (US); Bruce J. Sherwin, Jr., Woodinville, WA (US); David Alan Hepkin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 16/010,350

(22) Filed: Jun. 15, 2018

(65) Prior Publication Data
US 2019/0384591 A1 Dec. 19, 2019

(51) Int. Cl.
*G06F 8/656* (2018.01)
*G06F 9/455* (2018.01)

(52) U.S. Cl.
CPC .......... *G06F 8/656* (2018.02); *G06F 9/45558* (2013.01); *G06F 2009/45591* (2013.01)

(58) Field of Classification Search
CPC ................. G06F 8/656; G06F 9/45558; G06F 2009/45591
See application file for complete search history.

(56) References Cited

U.S. PATENT DOCUMENTS 7,472,384 B1 * 12/2008 Beloussov .............. G06F 8/656
                                                                717/168
7,886,287 B1 *  2/2011 Davda ..................... G06F 9/322
                                                                717/168

(Continued)

FOREIGN PATENT DOCUMENTS

CN    101799763 B  *  1/2013  ............. G06F 8/656
CN    104714822 A  *  6/2015  ............. G06F 8/656

(Continued)

OTHER PUBLICATIONS

Jeong et al., "Functional Level Hot-patching Platform for Executable and Linkable Format Binaries", Oct. 2017, IEEE (Year: 2017).*

(Continued)

*Primary Examiner* — Wei Y Zhen
*Assistant Examiner* — Junchun Wu
(74) *Attorney, Agent, or Firm* — Davin Chin; Chin IP, PLLC

(57) ABSTRACT

The disclosed technology is generally directed to the patching of executing binaries. In one example of the technology, at separate times, a plurality of hot patch requests is received. Each hot patch request of the plurality of hot patch requests includes a corresponding hot patch to hot patch the executing binary. A cardinality of the plurality of hot patch requested is greater than the fixed number of logical patch slots. with the executing binary continuing to execute, each time a request to apply a hot patch to the executing binary is received, the corresponding hot patch is assigned to an inactive logical patch slot of the fixed number of logical patch slots. The corresponding hot patch is executed from the assigned logical patch slot to hot patch the executing binary based on the corresponding hot patch.

20 Claims, 5 Drawing Sheets

(56) References Cited

U.S. PATENT DOCUMENTS

| | | | |
|---|---|---|---|
| 8,607,208 B1* | 12/2013 | Arnold | G06F 8/656 717/153 |
| 9,092,301 B2* | 7/2015 | Blumfield | G06F 8/65 |
| 10,019,240 B2* | 7/2018 | Li | G06F 8/48 |
| 10,248,409 B1* | 4/2019 | Pohlack | G06F 8/65 |
| 10,360,020 B2* | 7/2019 | Hirshberg | G06F 9/45558 |
| 2004/0107416 A1* | 6/2004 | Buban | G06F 8/658 717/170 |
| 2006/0288341 A1* | 12/2006 | Wurden | G06F 8/656 717/168 |
| 2010/0205587 A1* | 8/2010 | Dai | G06F 8/656 717/140 |
| 2014/0157232 A1* | 6/2014 | Li | G06F 8/48 717/110 |
| 2015/0178105 A1* | 6/2015 | Graham | G06F 9/45558 718/1 |
| 2015/0186049 A1 | 7/2015 | Scouller et al. | |
| 2017/0329618 A1* | 11/2017 | Tsirkin | G06F 12/1009 |

FOREIGN PATENT DOCUMENTS

| | | | | |
|---|---|---|---|---|
| CN | 107357622 A | * | 11/2017 | |
| EP | 2333666 A1 | | 6/2011 | |
| EP | 2434394 B1 | * | 10/2015 | ............. G06F 8/656 |
| KR | 20060045811 A | * | 5/2006 | ............... G06F 8/65 |
| WO | WO-2012062113 A1 | * | 5/2012 | ............. G06F 8/656 |

OTHER PUBLICATIONS

Ramaswamy et al., "Katana: A Hot Patching Framework for ELF Executables", 2010, IEEE (Year: 2010).*

Arnold et al., "Ksplice: Automatic Rebootless Kernel Updates", Apr. 2009, ACM (Year: 2009).*

Altekar et al., "OPUS: Online Patches and Updates for Security", Jul. 2005, USENIX Assoc., Berkeley, CA (Year: 2005).*

"International Search Report and Written Opinion Issued in PCT Application No. PCT/US2019/035898", dated Oct. 7, 2019, 12 Pages.

* cited by examiner

RESOURCE EFFICIENT DEPLOYMENT OF MULTIPLE HOT PATCHES

BACKGROUND

Virtualization technology may be employed in a wide variety of contexts. For example, virtualization technology may be employed to abstract physical computing resources from guest partitions, to enable higher utilization of the physical computing resources, to enable portability of guest partitions across physical devices, to protect the physical computing resources from malicious and/or erroneous code running in guest partitions, to protect secrets, to enforce security requirements or policy, and/or the like. In virtualization and other technologies, hot patching may be employed to patch binaries without reboot.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to the patching of executing binaries. In one example of the technology, at separate times, a plurality of hot patch requests is received. In some examples, each hot patch request of the plurality of hot patch requests includes a corresponding hot patch to hot patch the executing binary. In some examples, a cardinality of the plurality of hot patch requested is greater than the fixed number of logical patch slots. In some examples, with the executing binary continuing to execute, each time a request to apply a hot patch to the executing binary is received, the corresponding hot patch is assigned to an inactive logical patch slot of the fixed number of logical patch slots. In some examples, the corresponding hot patch is executed from the assigned logical patch slot to hot patch the executing binary based on the corresponding hot patch.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
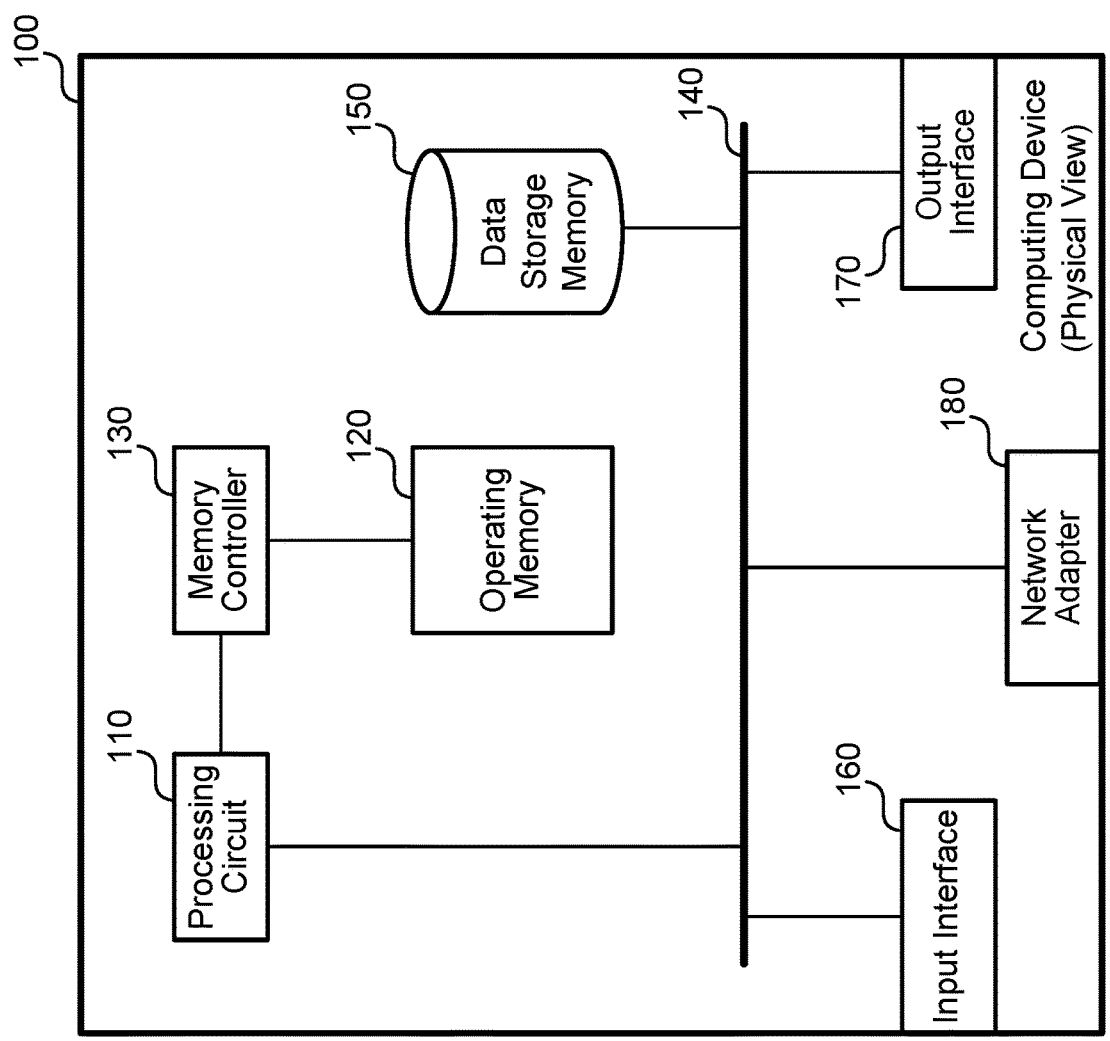
FIG. 1 is a block diagram illustrating a physical view of one example of a suitable computing device according to aspects of the disclosed technology.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to the patching of executing binaries. In one example of the technology, at separate times, a plurality of hot patch requests is received. In some examples, each hot patch request of the plurality of hot patch requests includes a corresponding hot patch to hot patch the executing binary. In some examples, a cardinality of the plurality of hot patch requested is greater than the fixed number of logical patch slots. In some examples, with the executing binary continuing to execute, each time a request to apply a hot patch to the executing binary is received, the corresponding hot patch is assigned to an inactive logical patch slot of the fixed number of logical patch slots. In some examples, the corresponding hot patch is executed from the assigned logical patch slot to hot patch the executing binary based on the corresponding hot patch.

Hot patching may refer to patching that occurs without reboot. In some examples, hot patching of an executing binary is accomplished with logical patch slots in which the patches are placed. The executing binary may be a hypervisor and/or an operating system kernel, and the executable binary may have bounded execution guarantees. There may be a finite number of logical patch slots, such as two logical patch slots. These logical patch slots may be in addition to a logical base slot in which the version of the executable binary image that booted is placed. Responsive to a new hot patch, in some examples, the hot patch is assigned to an inactive slot, and the hot patch is executed from the slot, which may patch both code and data in the executing binary. Responsive to a second hot patch, in some examples, the hot patch is likewise applied to an inactive slot, and a snapshot is then taken of the image version. The snapshot may then be used to determine the number of threads running in the current patch generation, and the version of all of the loaded images.

In some examples, each hot patch has a corresponding reference counter which is set to the number of threads running based on the current patch generation. Each of the threads running in the current patch generation may be sent a signal to unwind and rewind the call stacks of the thread. Responsive to a thread finishing rewinding, in some examples, the thread will naturally invoke the freshly patched function when appropriate. Thus the corresponding reference counter for the current patch generation is decremented by one.

Once the reference count for a patch generation reaches zero, in some examples, the logical slot is reclaimed and set to inactive, and all of the resources associated with the logical slot can be reclaimed. The logical slot can then be used for a subsequent hot patch. In some examples, based on the bounded execution guarantees, the logical slot is guaranteed to be reclaimed within a particular finite amount of time. In this way, an unlimited number of hot patches may be applied without reboot even though there are a finite number of logical slots.

Illustrative Computing Device

FIG. 1 is a diagram illustrating one example of a physical view of computing device 100 in which aspects of the technology may be practiced. Computing device 100 may be virtually any type of general- or specific-purpose computing device. For example, computing device 100 may be a user device such as a desktop computer, a laptop computer, a tablet computer, a display device, a camera, a printer, or a smartphone. Likewise, computing device 100 may also be server device such as an application server computer, a virtual computing host computer, or a file server computer. Computing device 100 may also be an IoT device that connects to a network to receive IoT services. Likewise, computer device 100 may be an example any of the devices illustrated in or referred to in FIGS. 2-5, as discussed in greater detail below. As illustrated in FIG. 1, computing device 100 includes processing circuit 110, operating memory 120, memory controller 130, data storage memory 150, input interface 160, output interface 170, and network adapter 180. Each of these afore-listed components of computing device 100 includes at least one hardware element.

Computing device 100 includes at least one processing circuit 110 configured to execute instructions, such as instructions for implementing the herein-described workloads, processes, or technology. Processing circuit 110 may include a microprocessor, a microcontroller, a graphics processor, a coprocessor, a field-programmable gate array, a programmable logic device, a signal processor, or any other circuit suitable for processing data. Processing circuit 110 is an example of a core. The aforementioned instructions, along with other data (e.g., datasets, metadata, operating system instructions, etc.), may be stored in operating memory 120 during run-time of computing device 100. Operating memory 120 may also include any of a variety of data storage devices/components, such as volatile memories, semi-volatile memories, random access memories, static memories, caches, buffers, or other media used to store run-time information. In one example, operating memory 120 does not retain information when computing device 100 is powered off. Rather, computing device 100 may be configured to transfer instructions from a non-volatile data storage component (e.g., data storage component 150 to operating memory 120 as part of a booting or other loading process.

Operating memory 120 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 110 via memory controller 130 in channels. One example of computing device 100 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 120 specifically does not include or encompass communications media, any communications medium, or any signals per se.

Memory controller 130 is configured to interface processing circuit no to operating memory 120. For example, memory controller 130 may be configured to interface commands, addresses, and data between operating memory 120 and processing circuit no. Memory controller 130 may also be configured to abstract or otherwise manage certain aspects of memory management from or for processing circuit no. Although memory controller 130 is illustrated as single memory controller separate from processing circuit no, in other examples, multiple memory controllers may be employed, memory controller(s) may be integrated with operating memory 120, or the like. Further, memory controller(s) may be integrated into processing circuit 110. These and other variations are possible.

In computing device 100, data storage memory 150, input interface 160, output interface 170, and network adapter 180 are interfaced to processing circuit 110 by bus 140. Although, FIG. 1 illustrates bus 140 as a single passive bus, other configurations, such as a collection of buses, a collection of point to point links, an input/output controller, a bridge, other interface circuitry, or any collection thereof may also be suitably employed for interfacing data storage memory 150, input interface 160, output interface 170, or network adapter 180 to processing circuit 110.

In computing device 100, data storage memory 150 is employed for long-term non-volatile data storage. Data storage memory 150 may include any of a variety of non-volatile data storage devices/components, such as non-volatile memories, disks, disk drives, hard drives, solid-state drives, or any other media that can be used for the non-volatile storage of information. However, data storage memory 150 specifically does not include or encompass communications media, any communications medium, or any signals per se. In contrast to operating memory 120, data storage memory 150 is employed by computing device 100 for non-volatile long-term data storage, instead of for run-time data storage.

Also, computing device 100 may include or be coupled to any type of processor-readable media such as processor-readable storage media (e.g., operating memory 120 and data storage memory iso) and communication media (e.g., communication signals and radio waves). While the term processor-readable storage media includes operating memory 120 and data storage memory 150, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 100 also includes input interface 160, which may be configured to enable computing device 100 to receive input from users or from other devices. In addition, computing device 100 includes output interface 170, which may be configured to provide output from computing device 100. In one example, output interface 170 includes a frame buffer, graphics processor, graphics processor or accelerator, and is configured to render displays for presentation on a separate visual display device (such as a monitor, projector, virtual computing client computer, etc.). In another example, output interface 170 includes a visual display device and is configured to render and present displays for viewing. In yet another example, input interface 160 and/or output interface 170 may include a universal asynchronous receiver/transmitter (UART), a Serial Peripheral Interface (SPI), Inter-Integrated Circuit ("I2C"), a General-purpose input/output (GPIO), and/or the like. Moreover, input interface 160 and/or output interface 170 may include or be interfaced to any number or type of peripherals.

In the illustrated example, computing device 100 is configured to communicate with other computing devices or entities via network adapter 180. Network adapter 180 may include a wired network adapter, e.g., an Ethernet adapter, a Token Ring adapter, or a Digital Subscriber Line (DSL) adapter. Network adapter 180 may also include a wireless network adapter, for example, a Wi-Fi adapter, a Bluetooth adapter, a ZigBee adapter, a Long Term Evolution (LTE) adapter, or a 5G adapter.

Although computing device 100 is illustrated with certain components configured in a particular arrangement, these components and arrangement are merely one example of a computing device in which the technology may be employed. In other examples, data storage memory 150, input interface 160, output interface 170, or network adapter 180 may be directly coupled to processing circuit no, or be coupled to processing circuit 110 via an input/output controller, a bridge, or other interface circuitry. Other variations of the technology are possible.

Some examples of computing device 100 include at least one memory (e.g., operating memory 120) adapted to store run-time data and at least one processor (e.g., processing unit 110) that is adapted to execute processor-executable code that, in response to execution, enables computing device 100 to perform actions.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices no are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120C can then be operatively coupled to additional network nodes 120 to form a computer network in a hierarchical, flat, mesh, or other suitable types of topology that allows communications between computing devices no and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices no is an IoT device, a device that comprises part or all of an IoT support service, a device comprising part or all of an application back-end, or the like, as discussed in greater detail below.

Figure 2:
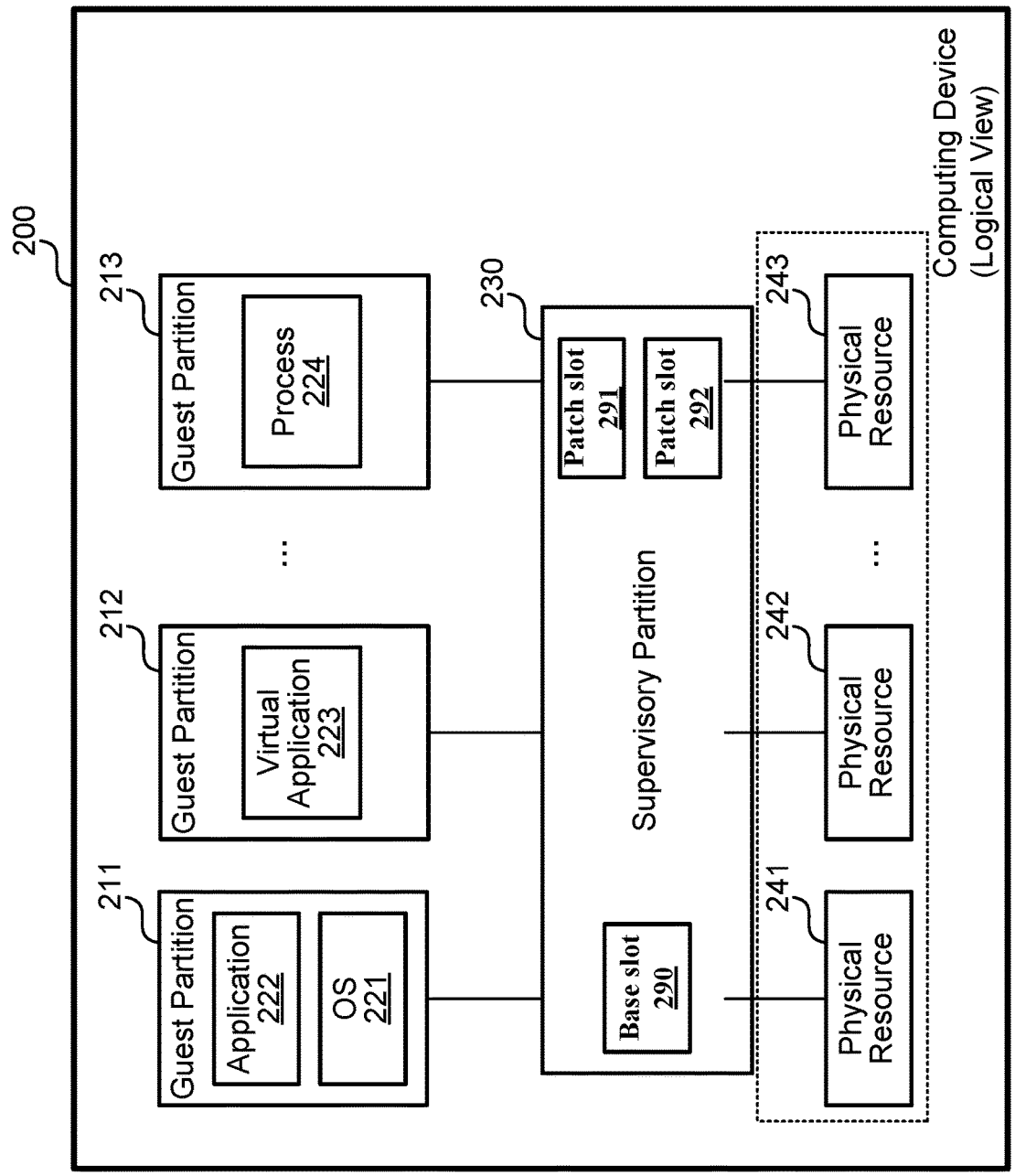
FIG. 2 is a block diagram illustrating a logical view of the example computing device according to aspects of the disclosed technology.

FIG. 2 is a diagram illustrating one example of a logical view of computing device 200 in which aspects of the technology may be practiced. Computing device 200 may be an example of computing device 100 of FIG. 1. In the illustration of FIG. 2, the logical components of computing device 200 include guest partitions 211-213, supervisory partition 230, and physical resources 241-243.

Physical resources 241-243 may include any variety of physical components, such as processor components, input/output (I/O) components, and/or other components or devices. For example, physical resources 241-243 may include any suitable combination of physical components, such as those discussed in conjunction with FIG. 1. Although illustrated as part of computing device 200, one or more of physical resources 241-243 (e.g., one or more data storage memories) can be implemented external to computing device 200. Various components or modules running on computing device 200, including supervisory partition 230, may access functionality(-ies) provided via physical resources 241-243 directly and/or indirectly via other components or modules.

Supervisory partition 230 may generate any number of guest partitions, e.g., guest partitions 211-213. Each of guest partitions 211-213 may be a VM, a virtualized application, a VBS execution environment, user mode process, and/or the like. For example, guest partition 211 is illustrated as a VM with operating system (OS) 221 and application 222, guest partition 212 is illustrated as a virtualized application 223, and guest partition 224 is illustrated as having process 224 executing therefrom.

Each of guest partitions 211-213 is a logical unit of isolation from which an operating system and/or other software executes. Each of guest partitions 211-213 may also include a guest virtual processor. The software executing within each of guest partitions 211-213 is isolated from the software executing in each of the other of guest partitions. E.g., the software executing in each of guest partitions 211-213 is not able to access, and need not be aware of, the software executing in each of the other guest partitions. Physical resources 241-243 are virtualized to guest partitions 211-213, and access to physical resources 241-243 is managed by supervisory partition 230.

As illustrated, computing device 100 includes supervisory partition 230. Supervisory partition 230, may include hypervisor such as a virtual machine monitor that manages access to the functionality provided by physical resources 241-243. In another example, supervisory partition 230 is kernel or kernel mode process of an OS, such as an OS that employs VBS.

In some examples, hot patching in computing device 200 may occur based on logical slots in supervisory partition 230. For instance, in some examples, supervisory partition 230 uses a base slot 290 for a hypervisor, and uses patch slot 291 and patch slot 292 for hot patches for the hypervisor.

Examples of computing device 100 and/or computing device 200 may perform hot patching as follows.

In some examples, hot patching of an executing binary is accomplished with logical slots in which the patches are placed. The executing binary may be an executing hypervisor and/or an executing operating system kernel, and the executable binary may have bounded execution guarantees. In some examples, the executing binary is an executing hypervisor that is an executing operating system kernel. There may be a finite number (i.e., cardinality) of slots, such as two slots (e.g., patch slots 291 and 292 of FIG. 2). These logical patch slots may be in addition to a logical base slot (e.g., base slot 290 of FIG. 2) in which the version of the executing binary image that is booted is placed. During boot, the binary may be executed from the base slot. Although FIG. 2 shows slots 290, 291, and 292, this is by way of example only, and in various examples, the slots may be in various suitable places in computing device 100 and/or computing device 200, such as in an OS kernel in OS 221 of FIG. 2 in some examples.

In some examples, a logical slot is effectively a virtual address (VA) region which may or may not be backed by physical pages. In some examples, a logical slot is effectively VA plus physical address (PA).

Responsive to a new hot patch to be applied, in some examples, the hot patch is assigned to an inactive slot, and the hot patch is executed from the slot, which may patch both code and data in the executing binary. An image may be supplied to the assigned slot, and the slot then becomes active. Responsive to the slot becomes active, in some examples, all new calls to the patched function execute from the new slot. In some examples, unpatched functions continue to execute from the old slot. In some examples, past calls from a function to be patched continue to execute from the old slot.

Responsive to a second hot patch to be applied, in some examples, the hot patch is likewise applied to an inactive slot, and a snapshot is then taken of the image version. The snapshot may then be used to determine the number of threads running in the current patch generation, and the version of all of the loaded images.

In some examples, each hot patch has a corresponding generation counter which is effectively the hot patch version in the active hot patch slot. In some examples, every thread is tagged with the generation counter, which indicates the generation to which the thread belongs. A reference counter is set to the number (i.e., cardinality) of threads running based on the current patch generation.

Each of the threads running in the current patch generation may be sent a signal to unwind and rewind the call stacks of the thread. In some examples, the unwind forces the thread back to the starting state of the thread, and the rewind is a rewind back to the beginning of the thread. Responsive to a thread finishing rewinding, in some examples, the thread naturally invokes the freshly patched function when appropriate, and the corresponding reference counter is decremented by one.

In some examples, the unwind and rewind occurs at particular points in the code. For instance, in some examples, after a thread has been signaled to unwind and remind, the unwind and rewind occurs responsive to the thread reaching a passive wait state, for instance, responsive to the thread is passively waiting in a queue. In some examples, while the thread is in an active wait state, unwind and rewind do not yet occur. An example of an active wait state is waiting for a lock. In some examples, because of the bounded execution guarantees, it is guaranteed that the thread will enter a passive wait state within a particular finite predetermined amount of time. In some examples, the threads are part of the executing binary, and the executing binary is also managing the hot patching; accordingly, in some examples, when a thread is signaling, the thread is signaling the part of the executing binary that is coordinating the hot patching.

In some examples, once the reference count for a patch reaches zero, this means that all of the threads for the associated patch have completed their rewind sequence. Accordingly, responsive to the reference count for a patch reaches zero, in some examples, the logical slot is reclaimed and set to inactive, atomically, and all of the resources, including pages, associated with the logical slot can be reclaimed. The logical slot can then be used for a subsequent hot patch. In some examples, based on the bounded execution guarantees, the logical slot is guaranteed to be reclaimed within a particular finite amount of time.

In this way, in some examples, a number (i.e., cardinality) of hot patches greater than number of logical patch slots the may be applied without reboot. Further, in this way, in some examples, an unlimited number of hot patches may be applied without reboot even though there are a finite number of logical slots.

In some examples, the hot patching performed in this manner guarantees that no threads are executing insecure code, within a small finite time span, and leverages the bounded execution guarantees to support an unlimited number of hot patches with finite and bounded memory overhead. The hot patching performed in this manner may accordingly bound the amount of resources, including memory, needed for a hot patch, so that memory cost is independent of the number of hot patches applied in a lifetime. The hot patching performed this manner may allow the patching of data, not just code. In some examples, the hot patching performed in this manner also allows strong security statements to be made for attestation purposes. For instance, in some examples, once the reference count for a particular patch-slot reaches zero, it can be attested that the pre-patch functionality is now gone. This may be used to prevent certain kinds of attacks, such as an attack that cuts off the stack to force a call to a vulnerable pre-patch function. In some examples, the pre-patch function no longer exists at that point, so that such an attack cannot be successful. The hot patching may be done not just for security, but also for a variety of different suitable reasons in various example, including adding new features and modifying behavior for other various suitable reasons such as correctness and performance.

Hot patching performed in this manner may be used for hot patching in any suitable environment, and particularly in environments that are sensitive to downtime, such as server environments. Hot patching in this manner may also be used for a variety of other suitable reasons and environments, including client and mobile environments. For instance, hot patching may be used in cloud hoster environments, and be used in client environments for example to avoid frequent regular reboots for patches on client devices.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 3:
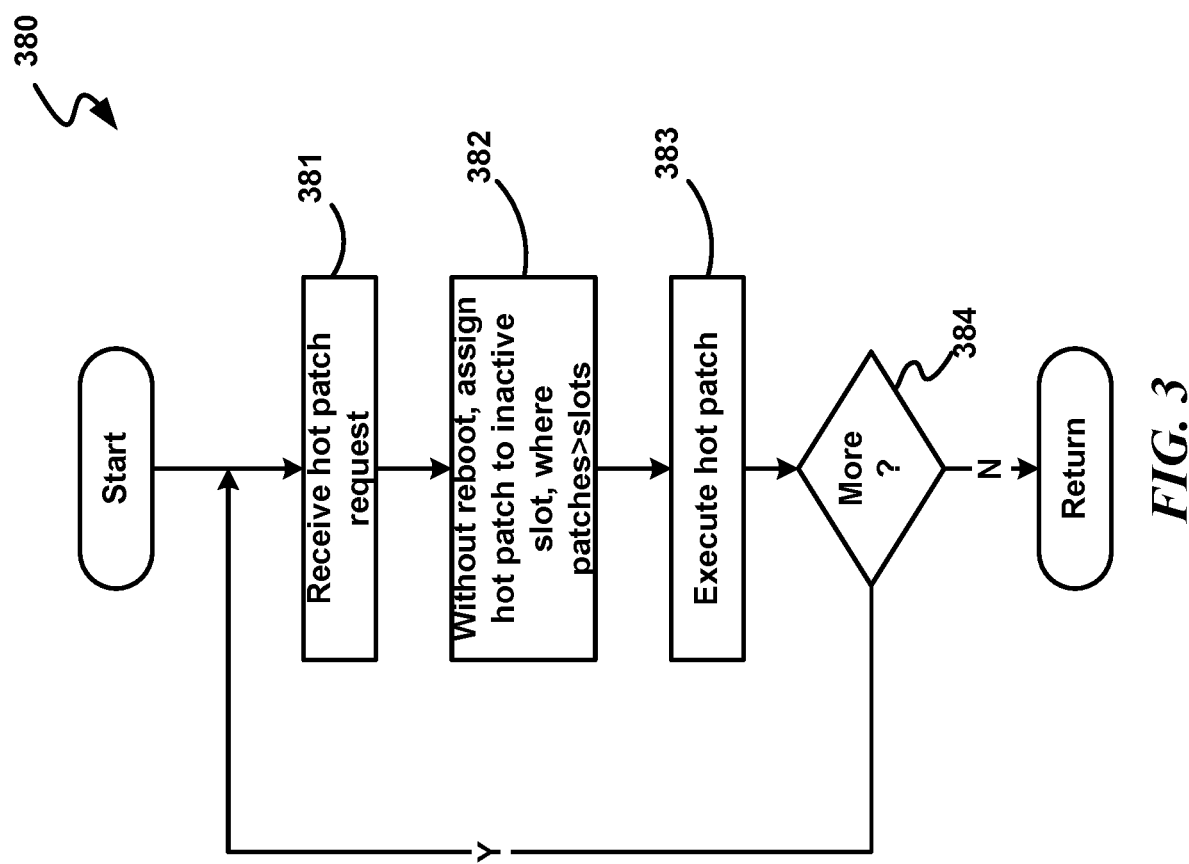
FIG. 3 illustrates an example process according to aspects of the disclosed technology.

FIG. 3 illustrates an example dataflow for a process (380). In some examples, process 380 is performed by a processor of a computing device, e.g., processing circuit 110 of FIG. 1 or physical resource 241, 242, or 243 of FIG. 2.

In the illustrated example, step 381 occurs first. At step 381, in some examples, a hot patch request is received. In some examples, a cardinality of the plurality of hot patch requested is greater than the fixed number of logical patch slots. As shown, step 382 occurs next in some examples. At step 382, in some examples, without rebooting the system running the executing binary, the corresponding hot patch is assigned to an inactive logical patch slot of the fixed number of logical patch slots. In some examples, if an inactive logical patch slot is not available, the hot patch may be deferred, e.g., placed in a queue or other structure for later execution, or failed.

At step 383, in some examples, the corresponding hot patch is executed from the assigned logical patch slot to hot patch the executing binary based on the corresponding hot patch. In some examples, 383 includes committing modifications to the base and/or patch image(s), e.g., as indicated in directives associated with the hot patch. As shown, decision block 384 occurs next in some examples. At decision block 384, in some examples, a determination is made as to whether there are more requests for hot patches to be received. If so, the process may return to step 381. If not, the process may then proceed to the return block, where other processing is resumed.

Figure 4A:
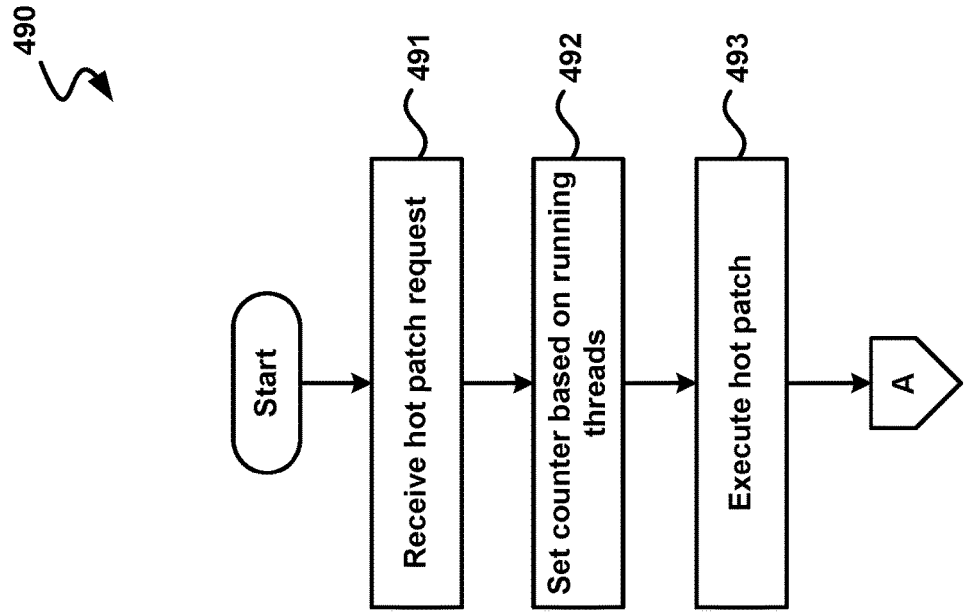
FIGS. 4A-4B illustrate another example process according to aspects of the disclosed technology.
Figure 4B:
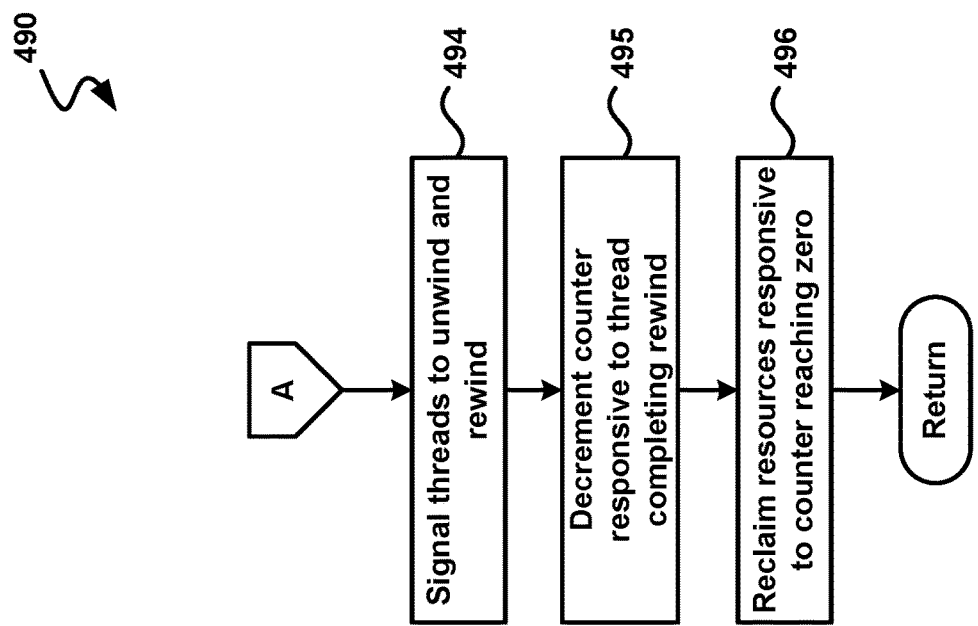

FIGS. 4A-4B illustrates an example dataflow for a process (490). In some examples, process 490 is performed by a processor of a computing device, e.g., processing circuit 110 of FIG. 1 or physical resource 241, 242, or 243 of FIG. 2.

In the illustrated example, step 491 occurs first. At step 491, in some examples, a request to apply a hot patch to an executing hypervisor is received. In some examples, a plurality of threads are running in a current image of the executing hypervisor. As shown, step 492 occurs next in some examples. At step 492, in some examples, responsive to the request, a reference counter associated with the hot patch is set to correspond to a cardinality the plurality of threads that are running the current image of the executing hypervisor.

As shown, step 493 occurs next in some examples. At step 493, in some examples, the hot patch is executed. As shown, step 494 occurs next in some examples. At step 494, in some examples, the plurality of threads is signaled to unwind and rewind. As shown, step 495 occurs next in some examples. At step 495, in some examples, each time a thread of the plurality of threads completes the rewind, the reference counter associated with the hot patch is decremented.

As shown, step 496 occurs next in some examples. At step 496, in some examples, in response to the reference counter reaching zero, resources associated with the hot patch are reclaimed with the executing binary continuing to execute. In some examples, this reclamation may include marking the logical patch slot associated with the hot patch as available for reuse, either by itself or in conjunction with other operations. As shown, the process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
   a device including at least one memory adapted to store run-time data for the device, and at least one processor that is adapted to execute processor-executable code that, in response to execution, enables the device to perform actions, including:
   providing a plurality of logical patch slots for patch images for hot patching an executing binary;
   receiving a hot patch request, the hot patch request including a hot patch for the executing binary;

assigning the hot patch to a first logical patch slot of the plurality of logical patch slots, based at least in part on the first logical patch slot being set as inactive;

executing the hot patch from the first logical patch slot, resulting in the first logical patch slot becoming active; and de-assigning a second logical patch slot of the plurality of logical patch slots, based at least in part on the second logical patch slot being active, the second logical patch slot distinct from the first logical patch slot, the second logical patch slot associated with a patch generation, wherein the de-assigning the second logical patch slot comprises:

signaling a first thread to unwind and rewind, the first thread included in a plurality of threads running in the patch generation;

responsive to the first thread finishing rewinding, decrementing a reference counter associated with the second logical patch slot, the reference counter corresponding to a cardinality of the plurality of threads running in the patch generation;

responsive to the reference counter reaching zero, setting the second logical patch slot as inactive.

2. The apparatus of claim 1, wherein the executing binary is an executing hypervisor.

3. The apparatus of claim 1, wherein the plurality of logical patch slots includes two logical patch slots.

4. The apparatus of claim 1, the actions further including: responsive to de-assigning the second logical patch slot, reclaiming resources associated with the second logical patch slot.

5. The apparatus of claim 1, wherein executing the hot patch causes code in the executing binary to be patched, and wherein executing the hot patch causes data in the executing binary to be patched.

6. The apparatus of claim 1, wherein the executing binary is an executing operating system kernel.

7. The apparatus of claim 6, wherein the executing operating system kernel is an executing hypervisor.

8. The apparatus of claim 1, the actions further including: responsive to the execution of the hot patch, setting a reference counter associated with the hot patch to correspond to a cardinality of the plurality of threads.

9. The apparatus of claim 8, wherein responsive to the first thread finishing rewinding, the first thread invokes an associated function according to a patched version of an associated function in response to the associated function being called.

10. The apparatus of claim 8, wherein responsive to the signaling of the first thread to unwind and rewind, the first thread of the plurality of threads begins to unwind and rewind upon the first thread reaching a passive wait state.

11. A method, comprising:

receiving a particular request to apply a particular hot patch to an executing binary, wherein a plurality of threads are running in a current image of the executing binary, wherein the particular request to apply the particular hot patch was received after receiving a prior request to apply a prior hot patch to the executing binary, and wherein the executing binary has executed without a restart for at least an entirety of a period between the receiving of the prior request and the receiving of the particular request;

responsive to the particular request to apply the particular hot patch, setting a reference counter associated with the particular hot patch to correspond to a cardinality of the plurality of threads that are running the current image of the executing binary;

executing the particular hot patch;

signaling a first thread of the plurality of threads to unwind and rewind, wherein the signaling is performed while the first thread is executing in a prior patch generation that corresponds to the prior hot patch and while a second thread of the plurality of threads is executing in another patch generation that is older than the prior patch generation;

based on the first thread completing the rewind, decrementing the reference counter associated with the particular hot patch; and in response to the reference counter associated with the particular hot patch reaching zero, reclaiming resources associated with the particular hot patch with the executing binary continuing to execute.

12. The method of claim 11, wherein the executing binary is an executing operating system kernel.

13. The method of claim 11, wherein responsive to the first completing the rewind, the first thread invokes an associated function according to a patched version of the associated function in response to the associated function being called.

14. The method of claim 11, wherein responsive to the signaling of the first thread to unwind and rewind, the first thread of the plurality of threads begins unwinding and rewinding upon the first thread reaching a passive wait state.

15. The method of claim 11, wherein executing the particular hot patch causes code in the executing binary to be patched, and wherein executing the particular hot patch causes data in the executing binary to be patched.

16. A processor-readable storage medium, having stored thereon processor-executable code that, upon execution by at least one processor, enables actions, comprising:

executing an operating system kernel with bounded execution guarantees, such that a plurality of threads are running on a current image of the executing operating system kernel;

beginning execution of a particular hot patch to the executing operating system kernel after a beginning of an execution of a prior hot patch to the executing operating system and while a first thread of the plurality of threads is operating in a different patch generation than a second thread of the plurality of threads, wherein the executing operating system has been executing without a restart for at least an entirety of a period between the beginning of the execution of the prior hot patch and the beginning of the execution of the present hot patch;

setting a counter associated with the particular hot patch to correspond to a cardinality of the plurality of threads;

signaling the first thread of the plurality of threads to unwind and rewind;

based on the first thread completing the rewind, decrementing the counter by one; and responsive to the counter reaching zero, reclaiming resources associated with the particular hot patch.

17. The processor-executable storage medium of claim 16, wherein the operating system kernel is a hypervisor.

18. The processor-executable storage medium of claim 16, wherein responsive to the first thread of the plurality of threads completing the rewind, the first thread invokes an associated function according to a patched version of the associated function in response to the associated function being called.

19. The processor-executable storage medium of claim 16, wherein responsive to the signaling of the first thread to unwind and rewind, the first thread of the plurality of threads begins unwinding and rewinding upon the first thread reaching a passive wait state.

20. The processor-executable storage medium of claim 16, wherein execution of the particular hot patch causes code in the executing binary to be patched, and execution of the particular hot patch causes data in the executing binary to be patched.

* * * * *